Nov. 26, 1968

H. R. KINCAID 3,413,046

BALANCING SUPPORT STAND

Filed March 14, 1967

INVENTOR.
HARRY R. KINCAID
BY
George E. Manias
AGENT

United States Patent Office 3,413,046
Patented Nov. 26, 1968

3,413,046
BALANCING SUPPORT STAND
Harry R. Kincaid, Johnstown, Ohio, assignor to International Research and Development Corporation, Worthington, Ohio, a corporation of Ohio
Filed Mar. 14, 1967, Ser. No. 623,129
9 Claims. (Cl. 308—15)

ABSTRACT OF THE DISCLOSURE

This invention relates to balancing support stands for use in dynamic balancing of rotors weighing up to about 10,000 pounds. The present balancing support stand utilizes the basic compound pendulum motion and consists of a rotor support and a yoke which is positioned below the rotor support and which is suspended by a pair of reeds. The present balancing support stand includes a vertically adjustable connecting mechanism for rotatably connecting the rotor support to the yoke, the arrangement being such that (a) the rotor support may undergo free rotary motion about a vertical axis normal to the longitudinal axis of the rotor and independently of the swinging motion of the yoke; and (b) the rotor support may be raised or lowered, as desired, relative to the yoke to accommodate differences in the diameter of the opposite ends of the rotor and to position the rotor horizontally without setting up stresses which would be manifested at the reeds suspending the yoke.

Background of the invention

*Field of the invention.*—This invention relates to the dynamic balancing of rotors, and more particularly to improvements in balancing support stands for use in supporting rotors during dynamic balancing thereof.

*Description of the prior art.*—The dynamic balancing of rotors is a highly developed art. In the so-called two-plane balancing technique, a test rotor is supported in a suitable balancing stand and is caused to rotate while supported on movable bearings. The movement of the bearings is consequential to the unbalance of the test rotor. The movement of the bearings is electromechanically converted into sinusoidal electrical impulses which are analyzed by appropriate phase and amplitude measurements to determine, in relation to the two-plane of measurement, the geometric location and quantity of unbalance in the test rotor.

The ideal balancing stand should be capable of (1) supporting a large load; (2) support rotors without scoring the rotor shafts; (3) accommodating movement of the rotor during vibration testing, which movement corresponds to the unbalance in the rotor; (4) vertical adjustments to accommodate different diameters of the opposite ends of the rotor; (5) vertical adjustments to support the rotor in a horizontal position; and (6) accommodating simultaneous vertical and horizontal movement of the rotor caused by a natural bow in the rotor shaft or the bow caused by the unbalance forces created during high speed rotation of the rotor.

The art is replete with simple and complex supporting stands which are for the most part quite bulky and space consuming. Although the prior art balancing stands include one or more of the above-described features, no one prior art balancing stand has been provided which includes all of the above-described desirable features.

Summary of the invention

Accordingly, the primary object of the present invention is to provide a balancing support stand having all of the above-described desirable features.

Another object of the present invention is to provide in one unitary structure, vertically adjustable means for rotatably connecting a rotor support to a yoke whereby the rotor support is free for rotation about a vertical axis and whereby the rotor support may be raised or lowered, as desired, relative to the yoke.

Still another object of the present invention is to provide a balancing support stand incorporating a detachable rotor support which may be quickly and easily interchanged with rotor supports having different configurations.

In accordance with the present invention, a balancing support stand is provided comprising a rotor support adapted to support one end of a rotor and permit rotation of the rotor about its longitudinal axis. A yoke is positioned below the rotor support and is connected to the rotor support by vertically adjustable connecting means of the invention. The vertically adjustable connecting means is provided at the center of the yoke and serves to rotatably connect the rotor support to the yoke for free rotary motion about a vertical axis normal to the longitudinal axis of the rotor and serves also for raising and lowering the rotor support relative to the yoke. Means is provided for suspending the yoke, the vertically adjustable connecting means and the rotor support, as a unit, for free horizontal swinging motion in a direction transversely of the longitudinal axis of the rotor.

As will become apparent, the vertically adjustable means of the present invention provides, in a single unitary structure, (a) a connection between the rotor support and the yoke; (b) a connection which permits the rotor support to undergo free rotary motion about a vertical axis; and (c) a connection which permits vertical adjustments to be made to the rotor support either when the rotor support is empty or when it is supporting a rotor.

Description of the drawings

The above and other objects and advantages of the present invention will become apparent from the following detailed description by reference to the accompanying drawings, in which.

Description of the preferred embodiments

Figure 1:
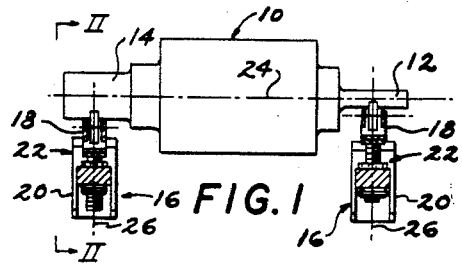
FIG. 1 is a side view, partly in cross section, schematically illustrating a rotor supported by a pair of the present balancing support stands.

Referring now to FIG. 1, there is illustrated a rotor 10 having different diameter end shafts 12, 14 each supported on a balancing support stand 16 of the present invention. Each of the balancing support stands 16 comprises, in general, a rotor support 18 supporting one end of the rotor 10 and a yoke 20 which is connected to the rotor support 18 by vertically adjustable connecting means 22 of the present invention. As shown in FIG. 1, the rotor supports 18 have been adjusted vertically to support the rotor 10 and its longitudinal rotational axis 24 in a horizontal position. As will become apparent, the vertically adjustable connecting means 22 also pivotally connects the rotor supports 18 to the yokes 20 such that the rotor supports 18 are capable of free rotary motion about a vertical axis, indicated by the dash-dot line 26, which is normal to the rotational axis 24.

Figure 4:
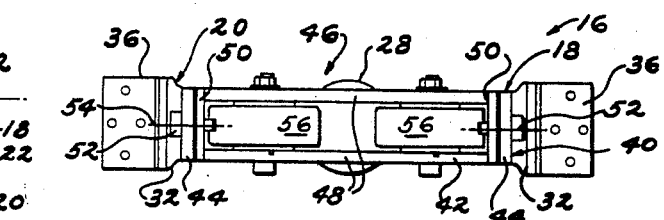
FIG. 4 is a plain view of the balancing support stand of FIG. 2.
Figure 3:
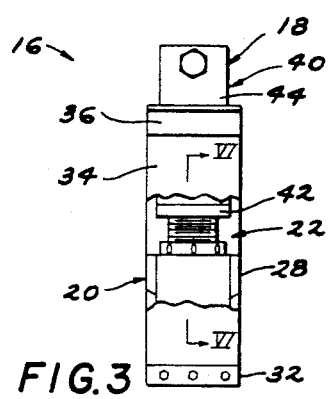
FIG. 3 is a side view of the balancing support stand of FIG. 2.
Figure 2:
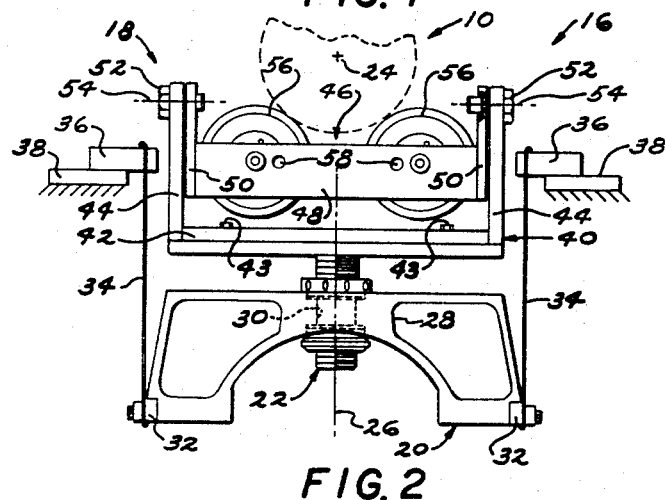
FIG. 2 is a front view of one of the present balancing support stands as viewed from the line II—II of FIG. 1.

*Yoke 20.*—Referring now to FIGS. 2–4, inclusive, the yoke 20 preferably comprises a cast aluminum piece which has been fabricated from a pattern and has a configuration which gives its maximum strength and minimum weight. The yoke 20 includes a central portion 28 having a central vertical bore 30 which receives the aforesaid vertically adjustable connecting means 22. The yoke 20 additionally includes mounting pads 32 to which the lower ends of spaced reeds 34 are clamped. The upper ends of the reeds 34 are clamped to mounting bars 36 which, in turn, are secured to a suitable support structure schematically illustrated in FIG. 2 at 38. The reeds 34 comprise means for suspending the rotor support 18, the yoke 20 and the vertically adjustable connecting means 22, as a unit, for free horizontal swinging motion in a direction transversely of the longitudinal rotational axis 24 of the rotor 10. The yoke 20 and the reeds 34 duplicate the basic compound pendulum operation used extensively in the prior art.

*Rotor support 18.*—In the preferred arrangement, the rotor support 18 comprises a support frame 40 including a horizontal frame member 42 detachably connected to the vertically adjustable connecting means 22 by fasteners 43 and vertical frame members 44 secured to and extending above the opposite ends of the horizontal frame member 42.

The rotor support 18 additionally includes a cradle 46 comprising horizontal side plates 48 maintained in spaced-apart substantially parallel relation by vertical end plates 50. The cradle 46 is positioned between the vertical frame members 44 and is pivotally connected thereto by fasteners 52. The fasteners 52 are aligned and provide a horizontal swing axis 54 which extends transversely of the rotational axis 24 of the rotor 10 and about which the cradle 46 undergoes free swinging motion. The cradle 46 is provided with spaced journals 56, preferably of the double-roll ball bearing type, which are shaft mounted between the side plates 48 for free rotation about axes extending parallel with the rotational axis 24 of the rotor 10. As can best be seen in FIG. 2, a number of bolt receiving openings 58 can be provided in the side plates 48 to accommodate different spacings of the journals 56 as required by different diameter shafts of different test rotors.

Figure 5:
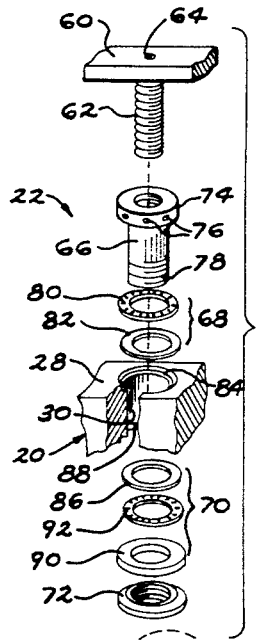
FIG. 5 is an isometric view, in exploded form, illustrating the component parts of the vertically adjustable means of the present invention in the order of assembly.

*Vertically adjustable connecting means 22.*—Reference is now directed to FIG. 5 wherein the present vertically adjustable connecting means 22 is shown in exploded form to illustrate its component parts in the order of their assembly.

Basically, the vertically adjustable connecting means 22 comprises a platform 60, an externally threaded rod 62 secured to the platform 60, for example by means of a fastener 64; an internally threaded tubular member 66; upper journal means 68; lower journal means 70; and a lock nut 72.

Figure 6:
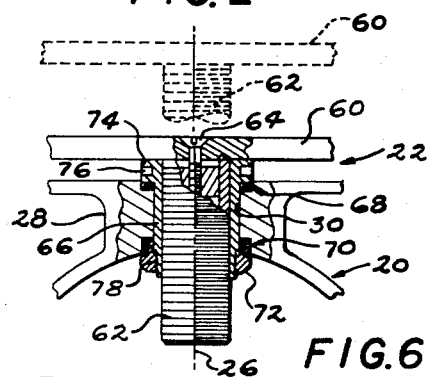
FIG. 6 is a fragmentary cross-sectional view taken along the line VI—VI of FIG. 3.

Referring now to FIGS. 5 and 6, the tubular member 66 is threaded onto the rod 62. By rotating the tubular member 66, the platform 60 and the rotor support 18 (not shown) may be raised or lowered to any desired elevation relative to the yoke 20. Two positions of the platform 60 are illustrated in FIG. 6. A radial flange 74 is provided at the upper end of the tubular member 66 and includes a plurality of angularly-spaced sockets 76 adapted to receive an extrinsic tool (not shown) for rotating the tubular member 66 relative to the rod 62. The tubular member 66 is provided with external threads 78 at its lower end for receiving the lock nut 72.

As can best be seen in FIG. 5, the upper journal means 68 preferably comprises a needle bearing 80 positioned to engage the lower face of the radial flange 74 and a thrust washer 82 positioned to engage an annular shoulder 84 formed in the yoke 20 at the upper end of the central vertical bore 30. The lower journal means 70 comprises a thrust washer 86 positioned to engage a lower annular shoulder 88 formed in the yoke 20 at the lower end of the central vertical bore 30, a collar 90 positioned for engagement by the lock nut 72 and preferably a needle bearing 92 interposed between the thrust washers 86 and the collar 90.

Referring now in particular to FIG. 6, the tubular member 66 is received within the central vertical bore 30 with the radial flange 74 engaging the upper journal means 68. The lock nut 72 is threaded onto the lower end of the tubular member 66 and engages the lower journal means 70. The lock nut 72 serves to retain the tubular member within the vertical central bore 30.

*Operation.*—As a test rotor is turned at relatively high speeds, the unbalance forces therein will cause the yoke member 20 to move a single plane between the two vertical reeds 34 (FIG. 2). The natural bow of the rotor or that bow created by the unbalance forces causes one or both of the end shafts of the rotor to undergo twisting movement, i.e., to rotate about an axis which intersects the rotational axis of the rotor 10. In other words, the rotational axis 24 of the rotor 10 will describe a conical surface as the rotor 10 undergoes the twisting movement. The twisting movement may be considered as consisting of simultaneous vertical and horizontal motion components. The horizontal motion component is accommodated through the threaded rod 62 and a sliding movement between the radial flange 74 and the upper journal means 68. The tubular member 66, the threaded rod 62 and the platform 60 will undergo rotary oscillations, as a unit, about the vertical axis 26 to accommodate the horizontal motion component. The vertical motion component is accommodated by the cradle 46 as it swings about the horizontal swing axis 54.

It is to be noted that there are no restoring forces in the vertically adjustable connecting means 22 which tends to return the platform 60 to a initial or centered position. Consequently, the rotary motion of the platform 60 does not add to or subtract from the unbalance forces acting on the yoke 20 and, therefore, does not affect the sinusoidal electrical impulses which are indicative of rotor unbalance.

It is also to be noted that the journals 56 are in line contact with the end shafts of the rotor and, hence, eliminate shaft scoring which has heretofore been prevalent in prior art cradles employing crowned roller bearings.

Alternative arrangements

Alternative arrangements of the present balancing support stand 16 will now be described with reference to FIGS. 7 and 8. Corresponding numerals will be employed to identify corresponding parts heretofore described.

Figure 7:
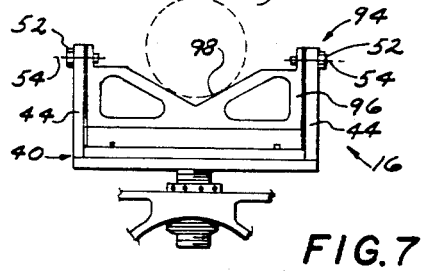
FIG. 7 is a fragmentary front view of the present balancing support stand illustrating an alternative arrangement wherein a V-block supports the end of a rotor.

Referring now in particular to FIG. 7, the present balancing support stand 16 may be provided with a rotor support 94 which comprises a support block 96 having a V-shaped groove adapted to rotatably support the end of a rotor. The support block 96 is positioned between the vertical frame members 44 of the support frame 40 and pivotally connected thereto by means of the fasteners 52. The support block 96 is swingable about the horizontal swing axis 54.

Figure 8:
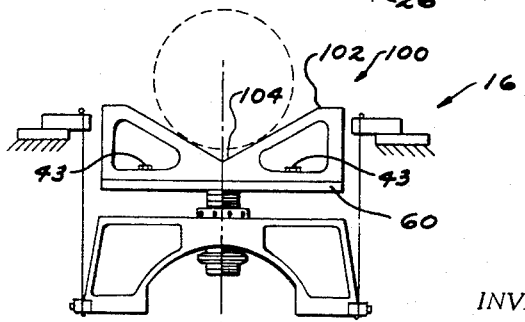
FIG. 8 is a front view of the present balancing support stand illustrating a further alternative arrangement thereof.

Referring now in particular to FIG. 8, the present balancing stand 16 may be provided with a rotor support 100 which comprises a support block 102 having a central V-shaped groove 104 adapted to rotatably support the end of a rotor. The support block 102 is detachably secured to the platform 60 by means of the fasteners 43.

Summary

From the foregoing detailed description it should be readily apparent that the present invention provides a balancing support stand which is capable of supporting large loads; which is capable of supporting rotors without scoring the rotor shafts; which is capable of accommodating movement of the rotor during vibration testing, which movement corresponds to the unbalance in the rotor; which may be adjusted vertically to accommodate different diameters at the opposite ends of the rotor and to support the rotor in a horizontal position; and which is capable of accommodating the simultaneous vertical and horizontal movements of the rotor caused by a natural bow in the rotor shaft or the bow caused by the unbalance forces created during high speed rotation of the rotor. Furthermore, the vertically adjustable connecting means of the present invention provides, in a single unitary structure, a connection which is the sole connection between the rotor support and the yoke; a connection which permits the rotor support to undergo free rotary motion about a vertical axis; and a connection which permits vertical adjustments to be made to the rotor support either when the rotor support is empty or when it is supporting a rotor.

I claim as my invention:

1. Supporting apparatus for use in dynamic balancing of a rotor about a longitudinal axis of said rotor, comprising:
    a rotor support adapted to support one end of a rotor and permit rotation of said rotor about said longitudinal axis;
    a yoke disposed below said rotor support;
    vertically adjustable means at the center of said yoke for rotatably connecting said rotor support to said yoke for free rotary motion about a vertical axis normal to said longitudinal axis and for raising and lowering said rotor support relative to said yoke; and
    means for suspending said yoke, said vertically adjustable means and said rotor support as a unit for free horizontal swinging motion in a direction transversely of said longitudinal axis.

2. The supporting apparatus defined in claim 1 wherein said vertically adjustable means comprises:
    an internally threaded tubular member journaled to said yoke for rotation about said vertical axis; and
    an externally threaded rod depending from said rotor support and into threaded engagement with said tubular member;
    said tubular member being rotatable about said vertical axis and relative to said yoke and said rotor support to cause raising and lowering of said rotor support relative to said yoke.

3. The supporting apparatus defined in claim 2 including
    a platform secured to the upper end of said threaded rod and extending transversely thereof;
    said rotor support being detachably secured to said platform.

4. The supporting apparatus defined in claim 1 wherein said vertically adjustable means comprises:
    said yoke having a central vertical bore whose central axis is coincident with said vertical axis;
    an annular shoulder formed in said yoke at an upper end of said vertical bore;
    an internally threaded tubular member disposed within said central vertical bore;
    a radial flange on said tubular member positioned above said annular shoulder;
    journal means interposed between and engaging said annular shoulder and said radial flange for supporting said tubular member for rotation about said vertical axis; and
    a threaded rod depending from said rotor support into threaded engagement with said tubular member.

5. The supporting apparatus defined in claim 4 including
    a lower annular shoulder formed in said yoke at a lower end of said vertical bore;
    lower journal means surrounding said tubular member and engaging said lower annular shoulder; and
    means engaging said lower journal means and said tubular member for retaining said tubular member within said vertical bore.

6. The supporting apparatus defined in claim 1 wherein said rotor support comprises:
    a support frame secured to said vertically adjustable means and including vertical frame members;
    a cradle positioned between said vertical frame members and including spaced bearings engageable by the end of said rotor, said bearings being supported by said support frame for rotation about horizontal axes parallel with said longitudinal axis; and
    means for pivotally connecting said cradle to said vertical frame members for free swinging motion about a horizontal swing axis extending transversely of said longitudinal axis.

7. The supporting apparatus defined in claim 6 wherein said horizontal swing axis and said vertical axis reside in a common plane.

8. The supporting apparatus defined in claim 1 wherein said rotor support comprises a support block having a V-shaped groove adapted to rotatably support the end of said rotor.

9. The supporting apparatus defined in claim 1 wherein said rotor support comprises:
    a support frame secured to said vertically adjustable means and including vertical frame members;
    a support block positioned between said vertical frame members and including a V-shaped groove adapted to rotatably support the end of said rotor; and
    means for pivotally connecting said support block to said vertical frame members for free swinging motion about a horizontal swing axis extending transversely of said longitudinal axis.

References Cited

UNITED STATES PATENTS 1,579,178   3/1926   Reynolds   308—33

MARTIN P. SCHWADRON, *Primary Examiner.*

CARROLL B. DORITY, JR., *Assistant Examiner.*